US012754704B2

(12) United States Patent
Jiang et al.

(10) Patent No.: US 12,754,704 B2
(45) **Date of Patent: *Oct. 6, 2026**

(54) NEAR EYE DISPLAY APPARATUS

(71) Applicant: Taiwan Semiconductor Manufacturing Company, Ltd., Hsinchu (TW)

(72) Inventors: Jheng-Hong Jiang, Hsinchu (TW); Shing-Huang Wu, Hsinchu (TW); Chia-Wei Liu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,429

(22) Filed: Nov. 22, 2023

(65) Prior Publication Data

US 2024/0086137 A1 Mar. 14, 2024

Related U.S. Application Data

(63) Continuation of application No. 17/700,414, filed on Mar. 21, 2022, now Pat. No. 11,914,915.

(Continued)

(51) Int. Cl.

*G06F 3/14* (2006.01)
*G02B 27/01* (2006.01)
*G06F 3/01* (2006.01)

(52) U.S. Cl.

CPC ....... *G06F 3/1423* (2013.01); *G02B 27/0172* (2013.01); *G02B 27/0179* (2013.01);

(Continued)

(58) Field of Classification Search

CPC ........ G06F 3/1423; G06F 3/013; G06F 3/147; G02B 27/0172; G02B 27/0179;

(Continued)

(56) References Cited

U.S. PATENT DOCUMENTS 10,020,352 B2 * 7/2018 Chung ................ H01L 27/1248
2003/0086059 A1 * 5/2003 Percival ................ A61B 3/113 351/208

(Continued)

FOREIGN PATENT DOCUMENTS

TW 201621397 A 6/2016
TW I691738 B 4/2020

(Continued)

OTHER PUBLICATIONS

First Office Action received in the corresponding Taiwanese Application 111128102, mailed Mar. 24, 2023, 7 pages.

(Continued)

*Primary Examiner* — Dmitriy Bolotin
(74) *Attorney, Agent, or Firm* — Kilpatrick Townsend & Stockton LLP

(57) ABSTRACT

A near eye display system is provided. The near eye display system includes: a frame; a first near eye display mounted on the frame and configured to form a first image directly projected on a first retina of a first eye of a user; a second near eye display mounted on the frame and configured to form a second image directly projected on a second retina of a second eye of the user; and a processing unit located at the frame and configured to generate a display control signal to drive the first near eye display and the second near eye display.

14 Claims, 8 Drawing Sheets

Related U.S. Application Data

(60) Provisional application No. 63/228,012, filed on Jul. 30, 2021.

(52) U.S. Cl.
CPC ...... *G06F 3/013* (2013.01); *G02B 2027/0112* (2013.01); *G02B 2027/0178* (2013.01)

(58) Field of Classification Search
CPC .... G02B 2027/0112; G02B 2027/0178; G09G 2354/00
See application file for complete search history.

(56) References Cited

U.S. PATENT DOCUMENTS

| | | | | |
|---|---|---|---|---|
| 2004/0189187 | A1* | 9/2004 | Chang | H10K 50/86 313/506 |
| 2005/0058785 | A1* | 3/2005 | Uhlig | H10K 71/135 428/32.24 |
| 2005/0093441 | A1* | 5/2005 | Uhlig | H10K 59/122 313/506 |
| 2010/0149073 | A1* | 6/2010 | Chaum | G02B 27/0075 345/8 |
| 2014/0002796 | A1* | 1/2014 | Marcos Munoz | A61B 3/14 351/246 |
| 2015/0185503 | A1* | 7/2015 | Tate | G02C 7/083 351/159.01 |
| 2016/0270656 | A1* | 9/2016 | Samec | A61B 3/1216 |
| 2016/0335475 | A1* | 11/2016 | Krenzer | G06T 7/337 |
| 2017/0299870 | A1* | 10/2017 | Urey | G02B 5/0242 |
| 2017/0338276 | A1* | 11/2017 | Nayak | H10H 29/142 |
| 2018/0137714 | A1* | 5/2018 | Schmidt | G07D 11/16 |
| 2019/0041642 | A1* | 2/2019 | Haddick | G02B 27/0172 |
| 2019/0086584 | A1* | 3/2019 | Wu | G02B 5/005 |
| 2019/0137766 | A1* | 5/2019 | Jang | H10K 59/38 |
| 2019/0167095 | A1* | 6/2019 | Krueger | A61B 3/113 |
| 2019/0217197 | A1 | 7/2019 | Sawaki | |
| 2020/0233492 | A1* | 7/2020 | Gotsch | G02B 27/0075 |
| 2020/0251638 | A1* | 8/2020 | Morris | H01L 24/80 |
| 2020/0326543 | A1* | 10/2020 | Kim | G06F 3/011 |
| 2020/0409185 | A1* | 12/2020 | Chin | G02C 11/10 |
| 2021/0143137 | A1* | 5/2021 | Kim | H01L 25/0753 |
| 2021/0239648 | A1* | 8/2021 | Huang | A61B 5/01 |
| 2021/0307608 | A1* | 10/2021 | Hu | A61B 3/14 |
| 2022/0236796 | A1* | 7/2022 | Konrad | G09G 3/002 |
| 2022/0384454 | A1* | 12/2022 | Hsu | H01L 29/66545 |
| 2023/0034562 | A1* | 2/2023 | Jiang | G06F 3/1423 |

FOREIGN PATENT DOCUMENTS

| | | | |
|---|---|---|---|
| TW | 202101072 | A | 1/2021 |
| TW | 202104976 | A | 2/2021 |

OTHER PUBLICATIONS

Office Action received in the corresponding Taiwanese Application 111128102, mailed Jul. 11, 2025.
The Office Action issued in Taiwanese corresponding application 111128102, mailed on Apr. 29, 2026.

* cited by examiner 600 602 552 552 558 560

| ENTRY # | MODEL # | USER ID | USER LEFT EYE PARAMETERS | USER RIGHT EYE PARAMETERS | INITIAL RECOMMENDED SETTINGS | FINAL USER SETTINGS |
|---|---|---|---|---|---|---|
| 1 | 0001 | A | $XL_A$, $YL_A$, $ZL_A$ | $XR_A$, $YR_A$, $ZR_A$ | S1 | S'1 |
| 2 | 0002 | A | $XL_A$, $YL_A$, $ZL_A$ | $XR_A$, $YR_A$, $ZR_A$ | S2 | S'2 |
| 3 | 0003 | A | $XL_A$, $YL_A$, $ZL_A$ | $XR_A$, $YR_A$, $ZR_A$ | S3 | S'3 |
| 4 | 0002 | B | $XL_B$, $YL_B$, $ZL_B$ | $XR_B$, $YR_B$, $ZR_B$ | S4 | S'4 |
| 5 | 0003 | C | $XL_C$, $YL_C$, $ZL_C$ | $XR_C$, $YR_C$, $ZR_C$ | S5 | S'5 |
| 6 | 0001 | D | $XL_D$, $YL_D$, $ZL_D$ | $XR_D$, $YR_D$, $ZR_D$ | S6 | S'6 |
| 7 | 0003 | D | $XL_D$, $YL_D$, $ZL_D$ | $XR_D$, $YR_D$, $ZR_D$ | S7 | S'7 |
| 8 | 0003 | E | $XL_E$, $YL_E$, $ZL_E$ | $XR_E$, $YR_E$, $ZR_E$ | S8 | S'8 |
| 9 | 0004 | E | $XL_E$, $YL_E$, $ZL_E$ | $XR_E$, $YR_E$, $ZR_E$ | S9 | S'9 |
| 10 | 0005 | E | $XL_E$, $YL_E$, $ZL_E$ | $XR_E$, $YR_E$, $ZR_E$ | S10 | S'10 |
| .... | .... | .... | .... | .... | .... | .... |

FIG. 6

NEAR EYE DISPLAY APPARATUS

CROSS-REFERENCES TO RELATED APPLICATIONS

The present application is a continuation application of U.S. patent application Ser. No. 17/700,414, filed Mar. 21, 2022, which claims priority to U.S. Provisional Patent Application No. 63/228,012, filed on Jul. 30, 2021, and entitled "Optimized Near Eye Display System," the entire disclosure of which is incorporated herein by reference.

FIELD

Embodiments of the present disclosure relate generally to wearable devices, and more particularly to near eye display (NED) apparatus.

BACKGROUND

The semiconductor industry has experienced rapid growth due to ongoing improvements in the integration density of a variety of electronic components (e.g., transistors, diodes, resistors, capacitors, etc.). For the most part, improvement in integration density has resulted from iterative reduction of minimum feature size, which allows more components to be integrated into a given area.

The development of the semiconductor industry enables wearable devices. Wearable devices are smart electronic devices (with, for example, micro-controllers) that are worn close to and/or on the surface of the skin of a user. Wearable devices detect, analyze, and transmit information concerning, for example, body signals and ambient data. There is a need to provide wearable devices that have better performance, lower power consumption, and smaller sizes and weights.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6 is an example data maintained in the database shown in FIG. 5 in accordance with some embodiments.

DETAILED DESCRIPTION OF THE INVENTION

Figure 1:
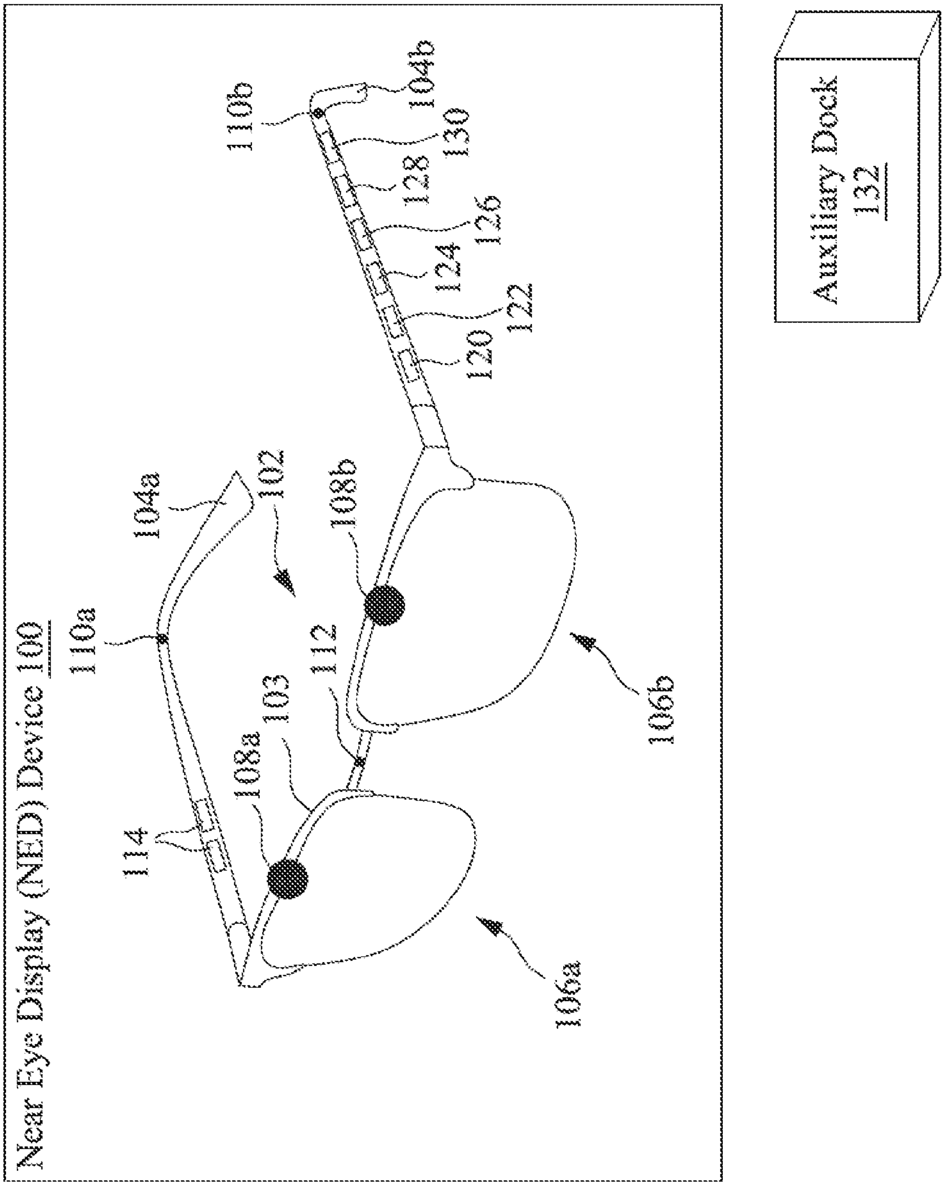
FIG. 1 is a schematic diagram illustrating an example NED system in accordance with some embodiments.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Some embodiments of the disclosure are described. Additional operations can be provided before, during, and/or after the stages described in these embodiments. Some of the stages that are described can be replaced or eliminated for different embodiments. Some of the features described below can be replaced or eliminated and additional features can be added for different embodiments. Although some embodiments are discussed with operations performed in a particular order, these operations may be performed in another logical order.

Near eye display (NED) devices, also referred to as mounted displays or wearable displays, are emerging wearable devices. A NED device may create a virtual image in the field of view of one or both eyes of a user. Just like that headphones and earbuds create a personal listening experience as compared to a speaker that creates a shared listening experience, a NED device creates small, portable, and personal viewing experiences as compared to a large screen like a television or a monitor. Therefore, a NED device has some advantages over a traditional large screen, including a compact size, a light weight, portability, and low power consumption.

NED devices have different categories, including immersive NED devices and see-through NED devices. Immersive NED devices block a user's view of the real world and create a large field of view image for the user instead. Immersive NED devices can be used for virtual reality (VR) and cinema glasses. See-through NED devices, on the other hand, leave a user's view almost intact and supplement it with a transparent or opaque image. See-through NED devices typically block only a small portion of the user's view of the real world, typically at its peripheral area. See-through NED devices can be used for augmented reality (AR) and smart glasses.

Due to the advantages of NED devices mentioned above, NED devices can be used in various applications, in both industrial and consumer contexts, including industrial VR displaying, VR training simulators, remote control robotics, equipment repair and assembly, warehouse inventory management, VR/AR gaming, smartphone accessories, 3D movie, smart glasses, and outdoor activity monitors.

As to immersive NED devices, it is challenging to provide a product that is light in weight while supporting powerful functions. Some immersive NED devices are heavy goggles or headsets, and users feel uncomfortable after a certain period of time. Manufacturers of those heavy goggles or headsets even recommend at least a break (ten to fifteen minutes) every thirty minutes. Users may feel dizziness, disorientation, motion sickness, or nausea frequently. Additionally, the resolution of NED devices is not as high as other displays (e.g., monitors, tablet displays, smartphone displays) due to their relatively smaller sizes. As a result, there is a need to raise the resolution of NED devices to enhance user experiences. Last but not least, most NED devices have some default settings without efficient accommodation or adjustment for each individual user. For instance, a user having both myopia and astigmatism may need settings dramatically different from a fighter pilot who operates a fighter jet.

In accordance with some aspects of the disclosure, near eye display systems and methods of operating the same are provided. In some implementations, the near eye display system is in the form of glasses having a frame. Two near eye sensors, each for one of the two eyes of the user, mounted on a main body of the frame are configured to measure user eye parameters of a user wearing the near eye display system. The user eye parameters may include one or more of cornea thickness, cornea curvature, pupil diameter, lens thickness, focus range, interpupillary distance (IPD), sphere (i.e., the lens power needed to see clearly if nearsighted or farsighted), cylinder (i.e., the lens power needed to correct astigmatism), and the like. The near eye display system also includes two near eye displays mounted on the main body. Each of them is configured to form an image projected on the retina of the user's left or right eye. The near eye display system also includes a processing unit located, for example, at a temple arm. The processing unit is configured to generate a display control signal based at least on the user eye parameters, and the display control signal drives the near eye displays accordingly.

In some implementations, the processing unit can generate initial recommended settings (e.g., the resolution, the brightness, the contrast, the saturation, the refresh rate, the color gamut, etc., for each of the near eye displays) based on the user eye parameters. In some examples, machine learning (ML) techniques such as a neural network engine can be used to generate the initial recommended settings. The initial recommended settings are then used to generate the display control signal. Different users get different and individualized initial recommended settings 558, which auto-compensate and accommodate each user's unique eye parameters. Therefore, the user experiences are improved due to the auto-compensation and accommodation described in detail below. Details of the near eye display system and the method of operating the same will be described below with reference to FIGS. 1-7.

FIG. 1 is a schematic diagram illustrating an example near eye display (NED) system 100 in accordance with some embodiments. The example NED system 100 is an immersive NED system and in the form of a pair of glasses. It should be understood that this is not intended to be limiting. The techniques disclosed herein is generally applicable to NED systems in other types or forms.

In the example shown in FIG. 1, the NED system 100 includes, among other things, a frame 102 having a main body 103 and two temple arms 104*a* and 104*b*, two near eye displays 106*a* and 106*b* mounted on the main body 103, two near eye sensors 108*a* and 108*b* mounted on the main body 103, two speakers 110*a* and 110*b* located at the two temple arms 104*a* and 104*b*, respectively, a microphone 112 located at the main body 103, multiple tuning buttons 114 located at the temple arm 104*a*, a processing unit 120 located at the temple arm 104*b*, a graphics processing unit (GPU) located at the temple arm 104*a*, a battery 124 located at the temple arm 104*a*, a memory device 126 located at the temple arm 104*a*, a communication unit 128 located at the temple arm 104*a*, and an interface port 130 located at the temple arm. It should be understood this configuration is not intended to be limiting. In other implementations, the battery 124 can be located on, for example, both temple arms 104*a* and 104*b* to provide a larger battery capacity.

The near eye sensors 108*a* and 108*b* (collectively referred to as "108") are located at the main body 103 and correspond to the right eye and the left eye of the user, respectively. The near eye sensors 108*a* and 108*b* are configured to capture or measure user eye parameters. User eye parameters are biological parameters related to a user's eyes. User eye parameters may include one or more of cornea thickness, cornea curvature, pupil diameter, lens thickness, focus range, interpupillary distance (IPD), sphere (i.e., the lens power needed to see clearly if nearsighted or farsighted), cylinder (i.e., the lens power needed to correct astigmatism), and the like. Some of those parameters are related to one single eye (i.e., the right eye or the left eye), whereas others (e.g., IPD) are related to both eyes.

In some implementations, the near eye sensors 108*a* and 108*b* are CMOS image sensors (CIS). A CMOS image sensor typically includes a micro lens that gathers light, color filters that separate out the red, green, and blue (i.e., "RGB") components, and a photodiode that captures the filtered light. In some examples, the near eye sensors 108*a* and 108*b* are front-side illumination (FSI) CMOS image sensors. In other examples, the near eye sensors 108*a* and 108*b* are backside illumination (BSI) CMOS image sensors.

In other implementations, the near eye sensors 108*a* and 108*b* are time of flight (TOF) sensors. TOF-based imaging is used in a number of applications, including range finding, depth profiling, and 3D imaging, such as light imaging, detection, and ranging (LIDAR). There are generally two types of TOF measurement, namely direct TOF measurement and indirect TOF measurement. Direct TOF measurement includes directly measuring the length of time between emitting radiation from an emitter and sensing the radiation by a detector after reflection from an object or other target. Indirect TOF measurement, on the other hand, includes determining the distance to the target by phase modulation of the amplitude of the signals emitted by the emitter and measuring phases (e.g., with respect to delay or shift) of the echo signals received at the detector. Details of near eye sensors and operations thereof will be described below with reference to FIGS. 2-3D.

The near eye displays 106*a* and 106*b* (collectively referred to as "106") are configured to form an image which is projected on the retinas of the user. Each of the near eye displays 106*a* and 106*b* has a high resolution and low power consumption. In one example, each of the near eye displays 106*a* and 106*b* has a high resolution of high definition (i.e., HD) with 1920 pixels in width and 1080 pixels in height. In other words, each of the near eye displays 106*a* and 106*b* can present about two million pixels, corresponding to about six million sub-pixels (i.e., RGB pixels). In another example, each of the near eye displays 106*a* and 106*b* has a high resolution of ultra-high definition (i.e., UHD or "4K") with 3840 pixels in width and 2160 pixels in height. In other words, each of the near eye displays 106*a* and 106*b* can present about eight million pixels, corresponding to about twenty-four million RGB pixels. It should be understood that these examples are not intended to be limiting and the near eye displays 106*a* and 106*b* can have other resolutions as needed.

In one embodiment, the near eye displays 106*a* and 106*b* are opaque and fabricated on a silicon substrate. In other words, the near eye displays 106*a* and 106*b* cannot be see-through, and the user interacts with the world based on the image projected on his or her retinas. In one implementation, each RGB pixel of the near eye displays 106*a* and 106*b* includes, among other things, a control transistor and a luminous device. The control transistor is fabricated using front-end-of-line (FEOL) processes on the silicon substrate. The control transistor is connected to the luminous device and provides a current source to control the intensity or luminance of the luminous device. Details of the silicon-based near eye displays will be described below with reference to FIG. 4.

It should be understood that although the near eye displays 106*a* and 106*b* in the example shown in FIG. 1 have an oval shape, it is not intended to be limiting. Various shapes such as rectangular can be used depending on the main body 103 of the frame 102 and a user's preference and taste.

The processing unit 120 is configured to execute computer program codes stored in the memory device 126 in order to cause the near eye display system 100 to fulfill its various functions. In some implementations, the processing unit 120 is a controller, a central processing unit (CPU), a multi-processor, a distributed processing system, an application specific integrated circuit (ASIC), other suitable processing units, or any combination thereof.

The GPU 122 is a dedicated graphics rendering device for the near eye displays 106*a* and 106*b* and is very efficient at manipulating computer graphics and image processing. The GPU 122 is configured to rapidly manipulate and alter memory to accelerate the creation of images in a frame buffer intended for output to the near eye displays 106*a* and 106*b*.

The memory device 126 is configured to store computer program codes that are executed by the processing unit 120 (and the GPU 122 in some embodiments) and other information needed for fulfilling various functions of the near eye display system 100. In some implementations, the memory device 126 includes one or more of a semiconductor or solid-state memory, a random access memory (RAM) such as static RAM (SRAM), a read-only memory (ROM). In some implementations, the memory device 126 includes flash memory devices. In other implementations, the memory device 126 includes one or more of emerging memory devices such as a resistive random-access memory (RRAM), phase-change random-access memory (PCRAM), magnetoresistive random-access memory (MRAM). It should be understood that the examples mentioned above are not intended to be limiting and other types of memory devices can be employed as well.

The communication unit 128 is configured to facilitate the communication between the near eye display system 100 and the outside world. For example, the near eye display system 100 can acquire data related to images or videos to be presented on the near eye displays 106*a* and 106*b* via the communication unit 128. The near eye display system 100 may communicate with the outside world by either wireless communication or wired communication. In some implementations, the communication unit 128 includes a radio frequency (RF) module. In other implementations, the communication unit 128 includes a WiFi module. It should be understood that these examples are not intended to be limiting and various communication protocols can be utilized as needed.

The interface port 130 is configured to provide connectivity to the near eye display system 100. In some implementations, the interface port 130 is a universal serial bus (USB) interface for data and power. The battery 124 can be charged through the USB interface, and data can be transmitted through the USB interface in the meantime. In one example, the USB interface is a USB Type-C port. It should be noted that these examples are not intended to be limiting and various types of interface ports and specifications can be employed as needed. In some examples, the near eye display system 100 may communicate with one or more of the following devices: a smartphone, a laptop, a smart TV, a smart speaker, a smart home appliance, a printer, a car, a Global Positioning System (GPS) tracking device, a machine, and other wearable devices.

The battery 124 provides a power supply to the near eye display system 100. In one implementation, the battery 124 is a lithium-ion battery. In another implementation, the battery 124 is a solid-state battery using a solid electrolyte instead of liquid or polymer gel electrolytes. As mentioned above, the battery 124 can be located at both the temple arms 104*a* and 104*b* to provide a higher battery capacity given the same power density of the battery. In some embodiments, the battery 124 can be charged through the interface port. In other embodiments, the battery 124 can be charged by conductive wireless charging technologies.

The speakers 110*a* and 110*b* are located at the temple arms 104*a* and 104*b*, respectively and configured to convert an electrical signal into sound. They are in close proximity to a user's right ear and left ear, respectively. The microphone 112 is located in the middle of the main body 103 and configured to convert sound (e.g., voice control instructions of the user) into an electrical signal. It should be understood that the configurations of the speakers 110*a* and 110*b* and the microphone 112 shown in FIG. 1 are not intended to be limiting.

The tuning buttons 114 are located at the temple arm 104*a*. In other implementations, the tuning buttons 114 may be located at both the temple arms 104*a* and 104*b*. The user can hit the tuning buttons 114 to manually control the operations (e.g., power on, power off, volume up, volume down, stop, pause, play, brightness up, brightness down, contrast up, contrast down, etc.) of the near eye display system 100. In some implementations, the manual control is in combination with instructions displayed on the near eye displays 106*a* and 106*b* and/or sound instructions output by the speakers 110*a* and 110*b*. It should be noted that the near eye display system 100 may include additional components shown in FIG. 1.

In addition, an auxiliary dock 132 may be used as an accessory to supplement the functionality of the near eye display system 100. In other words, the user does not have to use the auxiliary dock 132. The auxiliary dock 132 can be attached to the body of the user using, for example, a wrist band, an armband, a belt, and the like. In one embodiment, the auxiliary dock 132 can be used to charge the battery 124 with its own battery with a higher battery capacity (i.e., serving as a battery bank). In the meantime, the auxiliary dock 132 can provide the near eye display system 100 with additional computing power, and the near eye display system 100 can delegate a portion of its computation tasks to the additional processing units, GPUs, and memory devices located at the auxiliary dock. In some implementations, the auxiliary dock 132 is connected to and communicates with the near eye display system 100 through the interface port 130 in a wired communication manner. In other implementations, the auxiliary dock 132 is not connected to but communicates with the near eye display system 100 in a wireless communication manner.

Figure 2:
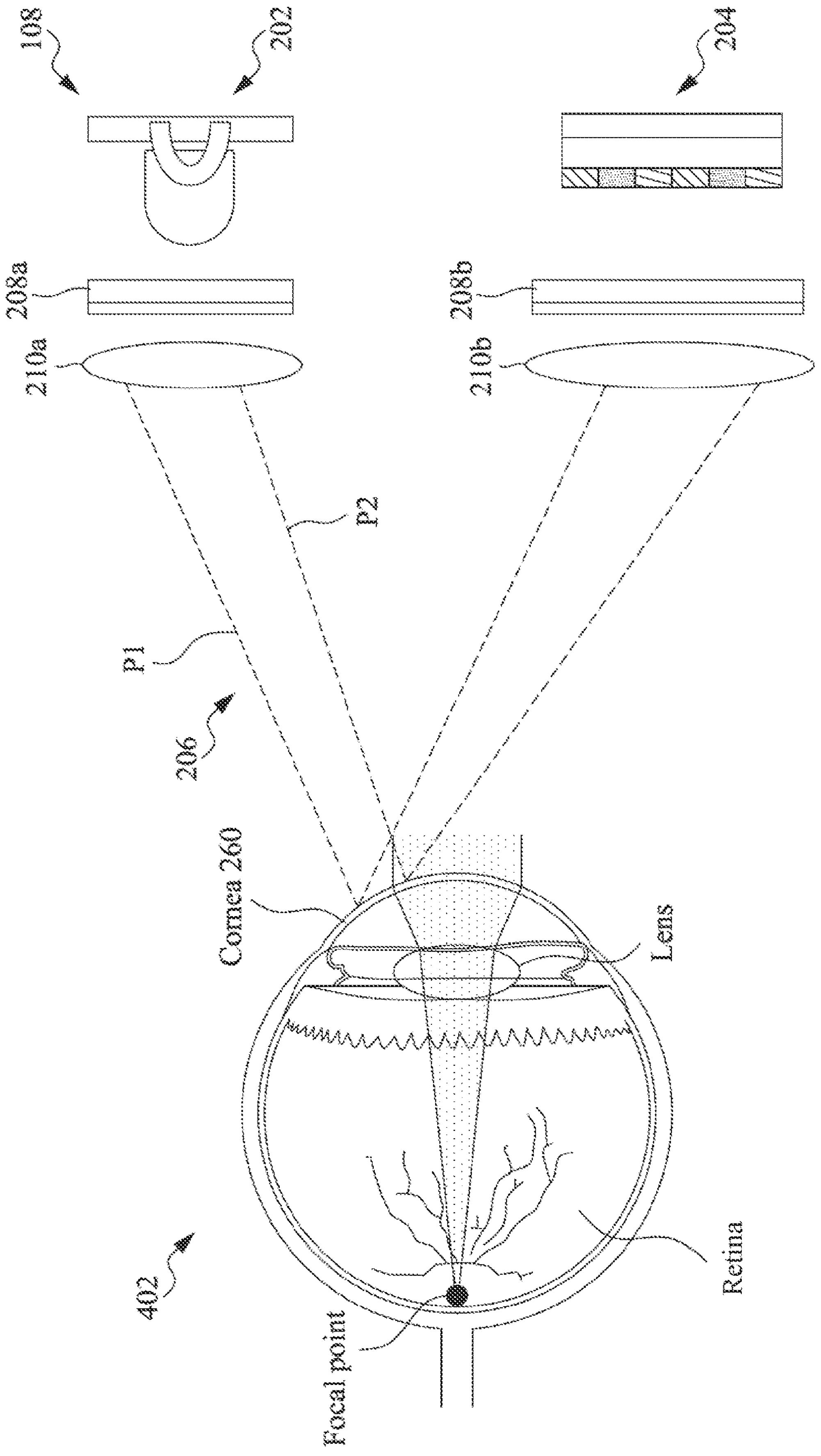
FIG. 2 is a schematic diagram illustrating an example near eye sensor in accordance with some embodiments.

FIG. 2 is a schematic diagram illustrating an example near eye sensor 108 in accordance with some embodiments. In the example shown in FIG. 2, the near eye sensor 108 includes, among other things, an emitter 202 and a detector 204. In some implementations, the near eye sensor 108 is a TOF near eye sensor. The emitter 202 emits light (e.g., infrared light) 206. After passing through a band-pass filter 208*a* and a lens 210*a*, the light 206 is reflected on the outer surface of the cornea 260 of the eye 402. The reflected light 206 travels through a lens 210*b* and a band-pass filter 208*b* and is then received by the detector 204. By measuring the length of time between emitting of the light 206 and detection of the light 206, the distance between the cornea 260 and the near eye sensor 108 can be calculated, given that the speed of the light 206 is known.

In some implementations, the emitter 202 is a light emitting diode (LED) or an array of LEDs. In other implementations, the emitter 202 is a laser diode or an array of laser diodes. In some implementations, the detector 204 is an imaging sensor (e.g., a CMOS imaging sensor or a charge-coupled device (CCD)) or an array of imaging sensors. In other implementations, the detector 204 is a photodetector or an array of photodetectors. In one example, the photodetector is a single-photon avalanche diode (SPAD). SPADs are semiconductor devices based on a p-n junction reverse-biased at a voltage V A that exceeds the breakdown voltage V B of the p-n junction. At the bias voltage VA, the electric field is so high that a single charge carrier injected into the depletion layer can trigger a self-sustaining avalanche. As a result, the current rises swiftly (e.g., on a sub-nanosecond scale) to a macroscopic steady level. The leading edge of the avalanche pulse marks the arrival time of the detected photon.

In the example shown in FIG. 2, the light path P1 and light path P2 correspond to different angles of the light 206 emitted by the emitter 202. Since the lengths of the light path P1 and the light path P2 can be calculated, the distances between the detector 204 and the outer surface of the cornea 260 at different positions can be calculated. In other words, a profile of the outer surface of the cornea 260 can be obtained.

FIGS. 3A-3D are schematic diagrams illustrating example applications of the near eye sensor 108 in accordance with some embodiments. In the example shown in FIG. 3A, the thickness of the cornea 260 of the eye 402 is measured by the near eye sensor 108 shown in FIG. 2. A light is emitted toward the cornea 260 and reflects at the outer surface of the cornea 260, as illustrated as the light path P3 in FIG. 3A. On the other hand, another light is emitted toward the cornea 260 and reflects at the inner surface of the cornea 260, as illustrated as the light path P4. Since the lengths of the light path P3 and the light path P4 can be calculated, the thickness of the cornea 260, which is proportional to the difference between the lengths of the light path P3 and the light path P4, can be calculated accordingly.

Figure 3B:
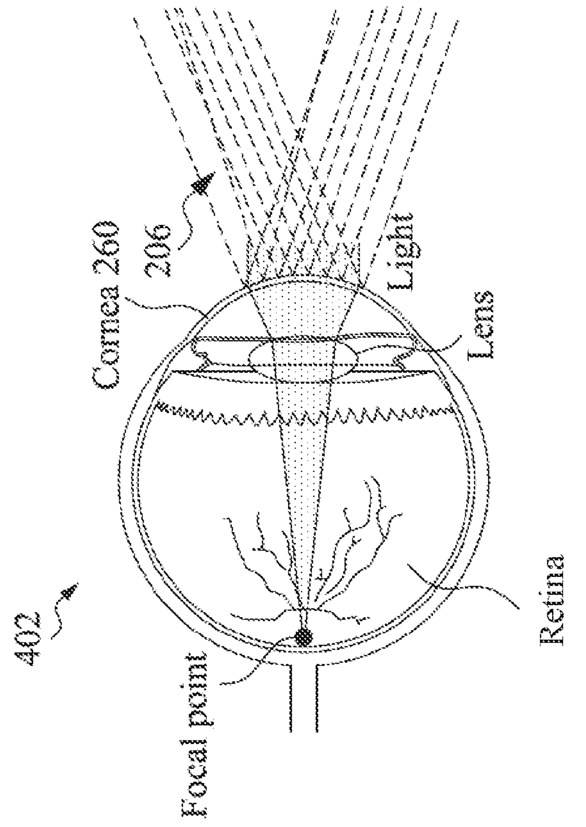
FIGS. 3A-3D are schematic diagrams illustrating example applications of the near eye detector in accordance with some embodiments.
Figure 3A:
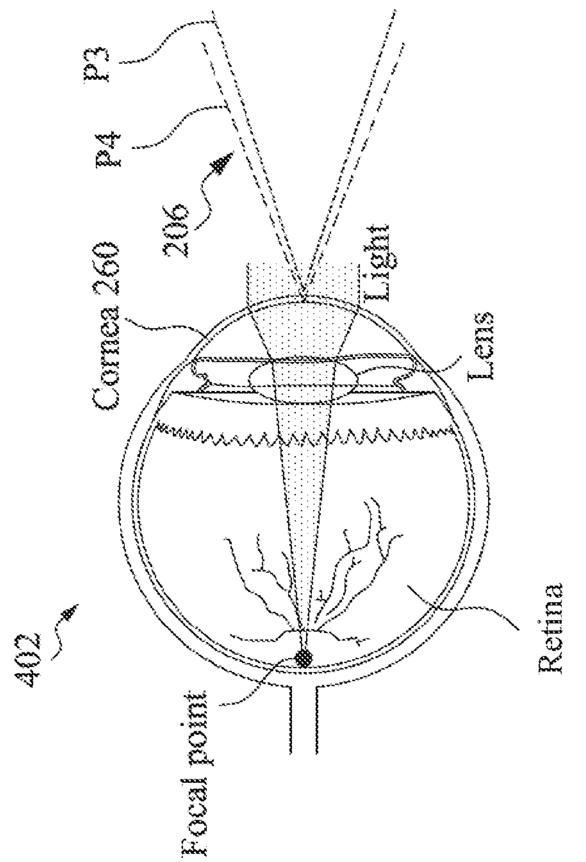

In the example shown in FIG. 3B, the curvature of the cornea 260 of the eye 402 is measured by the near eye sensor 108 shown in FIG. 2. As explained above, the lengths of various light paths can be calculated, and they correspond to distances between the near eye sensor 108 shown in FIG. 2 and the outer surface of the cornea 260 at various positions. Therefore, a profile of the outer surface of the cornea 260 can be obtained, and the curvature of the cornea 260 can be calculated based on the profile.

Figure 3C:
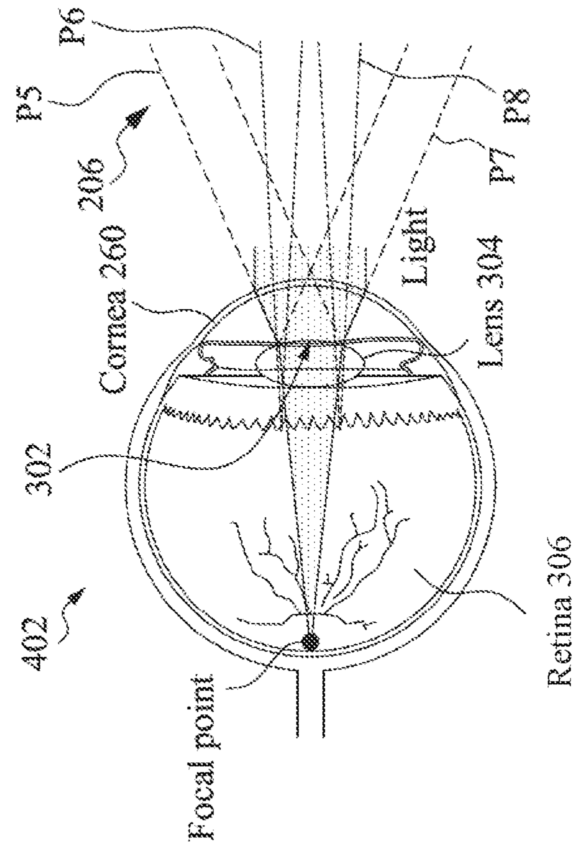

In the example shown in FIG. 3C, the pupil diameter of the pupil 302 of the eye 402 is measured by the near eye sensor 108 shown in FIG. 2. The pupil 302 of the eye 402 is a hole located in the center of the iris of the eye 402 that allows light 206 to pass through the lens 304 to strike the retina 306. In one implementation, the near eye sensor 108 shown in FIG. 2 can emit light in a scanning mode from one side of the pupil 302 to the other side of the pupil 302 across the center of the pupil 302. In the example shown in FIG. 3C, when the light 206 emitted transitions from the light path P5 (when the light 206 cannot pass through the pupil 302) to the light path P6 (when the light 206 can pass through the pupil 302), the lengths of the light path P5 and the light path P6 change considerably. As a result, the near eye sensor 108 shown in FIG. 2 can tell where the considerable change occurs, therefore knowing the upper boundary of the pupil 302 in the example shown in FIG. 3C Likewise, when the light 206 emitted transitions from the light path P7 (when the light 206 cannot pass through the pupil 302) to the light path P8 (when the light 206 can pass through the pupil 302), the lengths of the light path P7 and the light path P8 change considerably. As a result, the near eye sensor 108 shown in FIG. 2 can tell where the considerable change occurs, therefore knowing the lower boundary of the pupil 302 in the example shown in FIG. 3C. Based on the upper boundary and the lower boundary detected, the pupil diameter of the pupil 302 can be calculated accordingly.

Figure 3D:
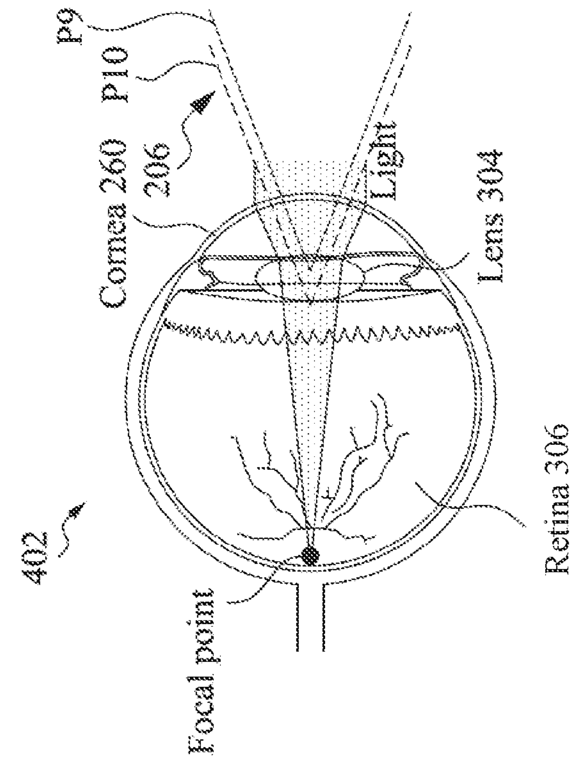

In the example shown in FIG. 3D, the thickness of the lens 304 of the eye 402 is measured by the near eye sensor 108 shown in FIG. 2. A light is emitted toward the lens 304 and reflects at the outer surface of the lens 304, as illustrated as the light path P9 in FIG. 3D. On the other hand, another light is emitted toward the lens 304 and reflects at the inner surface of the lens 304, as illustrated as the light path P10. Since the lengths of the light path P9 and the light path P10 can be calculated, the thickness of the lens 304, which is proportional to the difference between the lengths of the light path P9 and the light path P10, can be calculated accordingly.

It should be noted that the applications shown in FIGS. 3A-3D are four examples among various applications and are not intended to be limiting. Other user eye parameters may be captured by the near eye sensor 108 shown in FIG. 2 based on similar principles explained above with reference to FIGS. 3A-3D.

Figure 4:
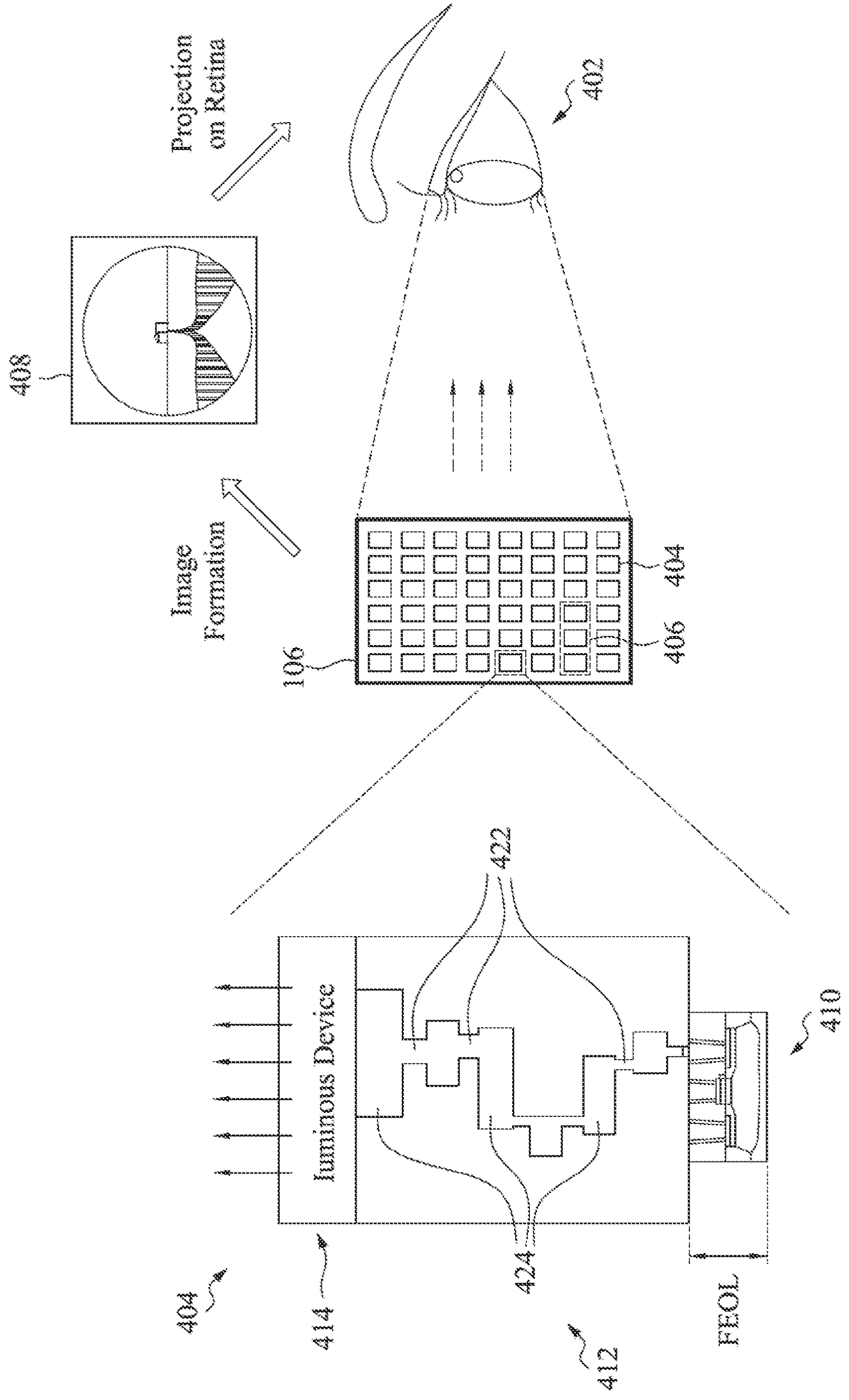
FIG. 4 is a diagram illustrating an example near eye display in accordance with some embodiments.

FIG. 4 is a diagram illustrating an example near eye display 106 in accordance with some embodiments. In the example shown in FIG. 4, the near eye display 106 forms an image 408, which is projected on the retina of the eye 402. The near eye display 106 have pixels 406 arranged in rows and columns, and each pixel 406 includes three sub-pixels (i.e., RGB pixels) 404 corresponding to red, green, and blue, respectively. As mentioned above, the near eye display 106 has a high resolution. For instance, the near eye display 106 may have an HD resolution with 1920 pixels 406 in width and 1080 pixels 406 in height. In other words, there are 2,073,600 pixels 406 and 6,220,800 RGB pixels 404 arranged on the near eye display 106.

In some implementations, each RGB pixel 404 has a structure illustrated in the enlarged portion shown in FIG. 4. In the example shown in FIG. 4, the RGB pixel 404 includes, among other things, a control transistor 410, a multi-layer interconnect (MLI) structure 412, and a luminous device 414. The control transistor 410 is electrically connected to the luminous device 414 through the MLI structure 412 and drives and controls the luminous device 414 by providing a current source. The control transistor 410 is a transistor fabricated using FEOL processes on, for example, a silicon substrate. In other words, the control transistor 410 is a silicon-based transistor. In some examples, the control transistor 410 is a fin field-effect transistor (FinFET). In other examples, the control transistor 410 is a gate-all-around (GAA) field-effect transistor (FET). In yet other examples, the control transistor 410 is a multi-bridge channel (MBC) field-effect transistor (FET). It should be understood that these examples are not intended to be limiting and other types of transistors may be employed as well. When the control transistor 410 is turned on by applying an appropriate voltage to the gate of the control transistor 410, the control transistor 410 is turned on. The current provided by the control transistor 410 can be tuned by applying different voltages to the drain of the control transistor 410. The tuned current provided by the control transistor 410 is used to control the luminous device 414.

The MLI structure 412 includes a combination of dielectric layers and conductive layers configured to form various interconnect structures. The conductive layers are configured to form vertical interconnect features 422 (e.g., device-level contacts, vias, etc.) and horizontal interconnect features 424 (e.g., conductive lines extending in a horizontal plane). Vertical interconnect features typically connect horizontal interconnect features in different layers (e.g., a first metal layer often denoted as "M1" and a fifth metal layer often denoted as "M5") of the MLI structure 412. It should be understood that although the MLI structure 412 is depicted in FIG. 4 with a given number of dielectric layers and conductive layers, the present disclosure contemplates MLI structures having more or fewer dielectric layers and/or conductive layers depending on design requirements of the RGB pixel 404.

The luminous device 414 receives the current provided by the control transistor 410 through the MLI structure 412. Since the current is stable and can be fine-tuned, the intensity or luminance of the luminous device 414 can be fine-tuned and stay stable as well. In one embodiment, the luminous device 414 is an organic light-emitting diode (OLED). The OLED has an emissive electroluminescent layer which is a film of organic material that emits light in response to the current provided by the control transistor 410. The film of organic material is situated between two electrodes. In order for the light to escape from the OLED, at least one of the electrodes is transparent. The organic molecules are electrically conductive as a result of delocalization of pi electrons caused by conjugation over part or all of the molecule. These organic materials have conductivity levels ranging from insulators to conductors, and are therefore considered organic semiconductors. The highest occupied and lowest unoccupied molecular orbitals (i.e., HOMO and LUMO) of organic semiconductors are analogous to the valence and conduction bands of inorganic semiconductors such as silicon, gallium nitride, silicon carbide, and the like. Unlike LEDs, which are small-point light sources, OLEDs are often made in sheets that are diffuse light sources. The diffuse light from OLEDs allows them to be used very close to the eyes 402 of a user without creating glare for the user. And because the OLED is close to the eyes 402, less total light can be used in order to achieve desired illuminance levels.

The color emitted from the OLED is determined by the type of organic material used. In some embodiments, the OLED is a small-molecule OLED (SM-OLED), and the organic material used is small molecules such as organometallic chelates, fluorescent and phosphorescent dyes and conjugated dendrimers. The production of SM-OLEDs often involves thermal evaporation in a vacuum, which enables the formation of well-controlled and homogeneous films, and the construction of complex multi-layer structures. In other embodiments, the OLED is a polymer light-emitting diode (PLED or P-OLED), and the organic material used is an electroluminescent conductive polymer that emits light when connected to an external voltage. Unlike SM-OLEDs, thermal evaporation in a vacuum is not needed. Polymers can be processed in solution, and spin coating is often used for depositing thin polymer films. P-OLEDs are quite efficient and require a relatively small amount of power for the amount of light produced.

Figure 5:
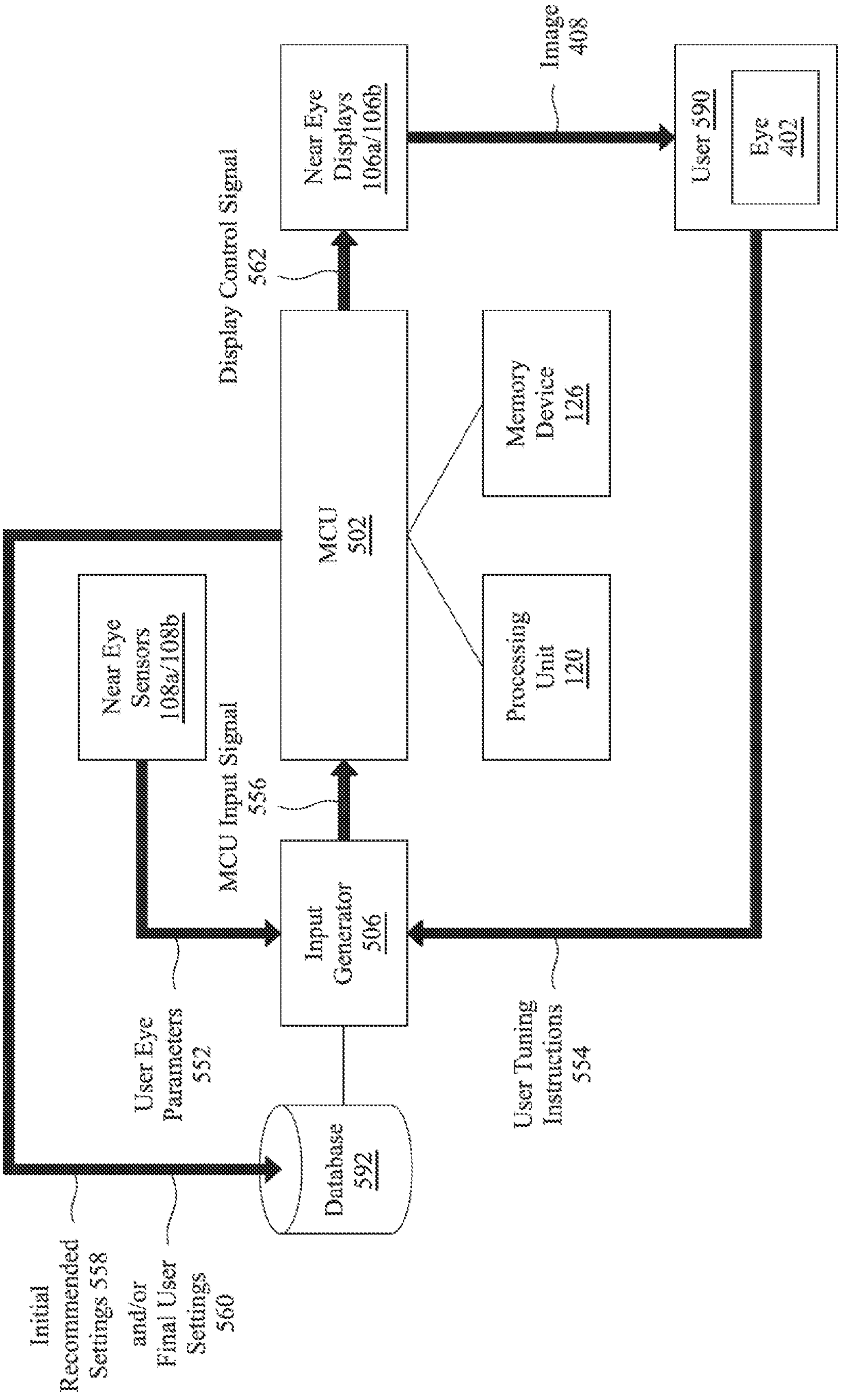
FIG. 5 is a schematic diagram illustrating the operations of an example near eye display system shown in FIG. 1 in accordance with some embodiments.

FIG. 5 is a schematic diagram illustrating the operations of an example near eye display system 100 shown in FIG. 1 in accordance with some embodiments. A microcontroller unit (MCU) 502 serves as the bridge between various input sources and the near eye displays **106*a*/106*b*. The MCU 502 receives an MCU input signal 556 from an input generator 506 and generates a display control signal 562 accordingly. The display control signal 562 then drives the near eye displays 106*a* and 106*b* to form images 408 that are projected on the retinas of eyes 402 of the user 590**.

As explained above, the near eye sensors **108*a* and 108*b* captures user eye parameters 552, such as cornea thickness, cornea curvature, pupil diameter, lens thickness, focus range, interpupillary distance (IPD), sphere, cylinder, and the like. In some implementations, the near eye sensors 108*a* and 108*b* are time of flight (TOF) sensors and operate as shown in FIG. 2. The user eye parameters 552 are fed to an input generator 506**.

The input generator 506 is configured to collect a variety of inputs, including the user eye parameters 552, and generate MCU input signal 556. In some embodiments, the input generator 506 is also configured to collect user tuning instructions 554, which will be described in detail below. In other embodiments, the input generator 506 is also configured to collect data from a database 592, which will be described in detail below. The input generator 506 collects various inputs from various sources and then generates the MCU input signal 556 based on the various inputs. In the example shown in FIG. 5, the input generator 506 is outside the MCU 502. But this is exemplary rather than limiting. In some embodiments, the input generator 506 is a part of the MCU 502.

The MCU 502, which is a small computing unit on a chip that contains one or more CPUs along with memory and programmable input/output peripherals, is connected between the input generator 506 and the near eye displays **106*a* and 106*b*. In the example shown in FIG. 5, the MCU 502 is also connected to the processing unit 120 and the memory device 126 shown in FIG. 1. Since the MCU 502 also include its own CPUs and memory device as well, the MCU 502 has adequate computational capacity and memory capacity to empower the operations described in FIG. 5**.

In one embodiment, the MCU input signal 556 is in the form of the user eye parameters 552, and the MCU 502 generates initial recommended setting 558 based on the user eye parameters 552. In one example, the user eye parameters 552 include the left eye sphere, the left eye cylinder, the left eye pupil diameter, the right eye sphere, the right eye cylinder, the right eye pupil diameter, and the interpupillary distance of the user 590. In one example, the initial recommended settings 558 generated by the MCU 502 for the user 590 includes one or more of the resolution, the brightness, the contrast, the saturation, the refresh rate, the color gamut for each of the near eye displays 106*a* and 106*b*. It should be understood that the initial recommended settings 558 are exemplary rather than limiting, and other types of initial recommend settings can be employed. The initial recommended settings 558 are customized or individualized for the user 590 based on the user eye parameters 552 for the user 590. Different users get different and individualized initial recommended settings 558, which auto-compensate and accommodate each user's unique eye parameters. Therefore, the user experiences are improved due to the auto-compensation and accommodation described herein.

In addition, different eyes 402 of the same user 590 may get different and customized initial recommended settings 558, which auto-compensate and accommodate the difference in the left eye and the right eye. For instance, the user 590 may have different sphere values and cylinder values for his left eye and right eye. As a result, the MCU 502 generates different initial recommended settings 558 for the near eye displays 106*a* and 106*b* to compensate the differences in the left eye parameters and the right eye parameters. In such a way, the user 590 can get optimal settings for both eyes simultaneously. In summary, the MCU 502 can generate recommended settings that are customized or individualized for each individual user 590 and each of his or her eyes 402.

The MCU 502 then generates the display control signal 562 based on the initial recommended settings 558. In one example, the display control signal 562 includes control signals, for the RGB pixels 404 shown in FIG. 4, that tune the currents provided by the control transistor 410 shown in FIG. 4, and the currents in turn tune the luminous devices 414 shown in FIG. 4. In one implementation, for each RGB pixel 404 shown in FIG. 4, the control signals include a gate voltage signal (i.e., V G) and a drain voltage signal (i.e., V D). The gate voltage signal turns on or off the control transistor 410, whereas the drain voltage signal controls the magnitude of the current. In one implementation, the control transistor 410 is a transistor fabricated using FEOL processes on a silicon substrate. The current can be controlled with a high level of precision and keeps stable during the operation of the near eye displays 106*a* and 106*b*.

In some embodiments, the user 590 can tune the initial recommended settings 558 by sending user tuning instructions 554. The user tuning instructions 554 are received by the input generator 506, which will be reflected in the MCU input signal 556. Based on the MCU input signal 556, the MCU 502 can generate final user settings 560 and display control signal 562 accordingly. As a result, the settings of the near eye displays 106*a* and 106*b* are adjusted accordingly. In other words, the display control signal 562 is generated based on the user tuning instructions 554. The user tuning instructions 554 provide a feedforward loop to the near eye display system 100.

In one implementation, the user tuning instructions 554 are generated by pressing, hitting, or sliding the tuning buttons 114 shown in FIG. 1. The user 590 can press or hit the tuning buttons 114 to tune settings such as increase the brightness. In some examples, the user 590 can see some control information displayed on at least one of the near eye displays 106*a* and 106*b* when he or she is tuning settings. The control information displayed may be in the form of a menu, a dialog box, a drop-down list, a sliding bar, and the like. As such, the user 590 can have the interactions with the near eye display system 100 necessary to complete the tuning of the settings.

In another implementation, the user tuning instructions 554 are voice instructions received by the microphone 112 shown in FIG. 1. The user 590 can speak, and voice instructions (e.g., "Brightness up," "Contrast down," "Resolution to 4K," etc.) can be received through the microphone 112. The voice instructions are processed and interpreted by the MCU 502, which is equipped with voice recognition modules embedded in the MCU 502. In some implementations, the voice recognition modules utilize artificial intelligence (AI) techniques, such as machine learning (ML) techniques. Likewise, in some examples, the user 590 can see some control information displayed on at least one of the near eye displays 106*a* and 106*b* when he or she is tuning setting. In other examples, the user 590 can hear some control information output by the speakers 110*a* and 100*b* shown in FIG. 1. As such, the user 590 can have the interactions with the near eye display system 100 necessary to complete the tuning of the settings.

In another implementation, the user tuning instructions 554 can be generated by both pressing the tuning buttons 114 and by receiving voice instructions using the microphone 112. In other words, the user tuning instructions 554 come from two sources. It should be noted that although these implementations are not intended to be limiting, and other suitable implementations may be employed as well.

As briefly described above, the input generator 506 is also configured to collect data from a database 592 in some embodiments. The database 592 maintains and updates data related to different users, their eye parameters, their initial recommended settings, and their final user settings, and the like. Once the user eye parameters 552 for the user 590 are obtained, AI techniques (e.g., machine learning techniques) can be used to generate the initial recommended settings 558 using data in the database 592.

In one implementation, the initial recommended settings 558 for the user 590 are determined using a neural network engine, based on the similarities between the user eye parameters 552 for the user 590 and user eye parameters for other users. The more similar the user eye parameters, the more similar the initial recommended settings. In one example, the user eye parameters 552 for the user 590 and user eye parameters for other users are characterized as feature vectors, respectively. Each feature vector corresponds to user eye parameters for one user. Then the similarities are cosine similarities between the feature vector corresponding to the user 590 and feature vectors corresponding to other users. It should be noted that the implementation based on the neural network engine is not intended to be limiting, and other AI techniques can be employed to generate the initial recommended settings 558 for the user 590.

On the other hand, the initial recommended settings 558 and/or the final user settings 560 for the user 590 can be stored in the database 592. As such, the database 592 can accumulate more and more data for different users over time, which empowers better initial setting recommendations.

FIG. 6 is an example data 600 maintained in the database 592 shown in FIG. 5 in accordance with some embodiments. In the example shown in FIG. 6, the data 600 includes many (e.g., thousands, tens of thousands, or the like) entries 602. These entries 602 are related to different users (e.g., denoted as "USER ID" in FIG. 6) and different product models (e.g., denoted as "MODEL #"). For instance, Entry #1 is related to User A wearing a Model #0001, whereas Entry #2 is related to User A wearing a Model #0002. For the same user wearing different models, the eye parameters 552 are the same, but the initial recommended settings 558 vary for different models. Similarly, for different users wearing the same model (e.g., Entry #5 and Entry #7), the eye parameters 552 are different, and the initial recommended settings 558 are different for different users.

The final user settings 560 are also maintained in the database. The comparison between the initial recommended settings 558 and the final user settings 560 can also be utilized to evaluate how well the recommendation is. Also, it can be analyzed how the differences in the initial recommended settings 558 and the final user settings 560 correlate to the user eye parameters 552. The knowledge of the correlation can help improve the initial setting recommendation.

Figure 7:
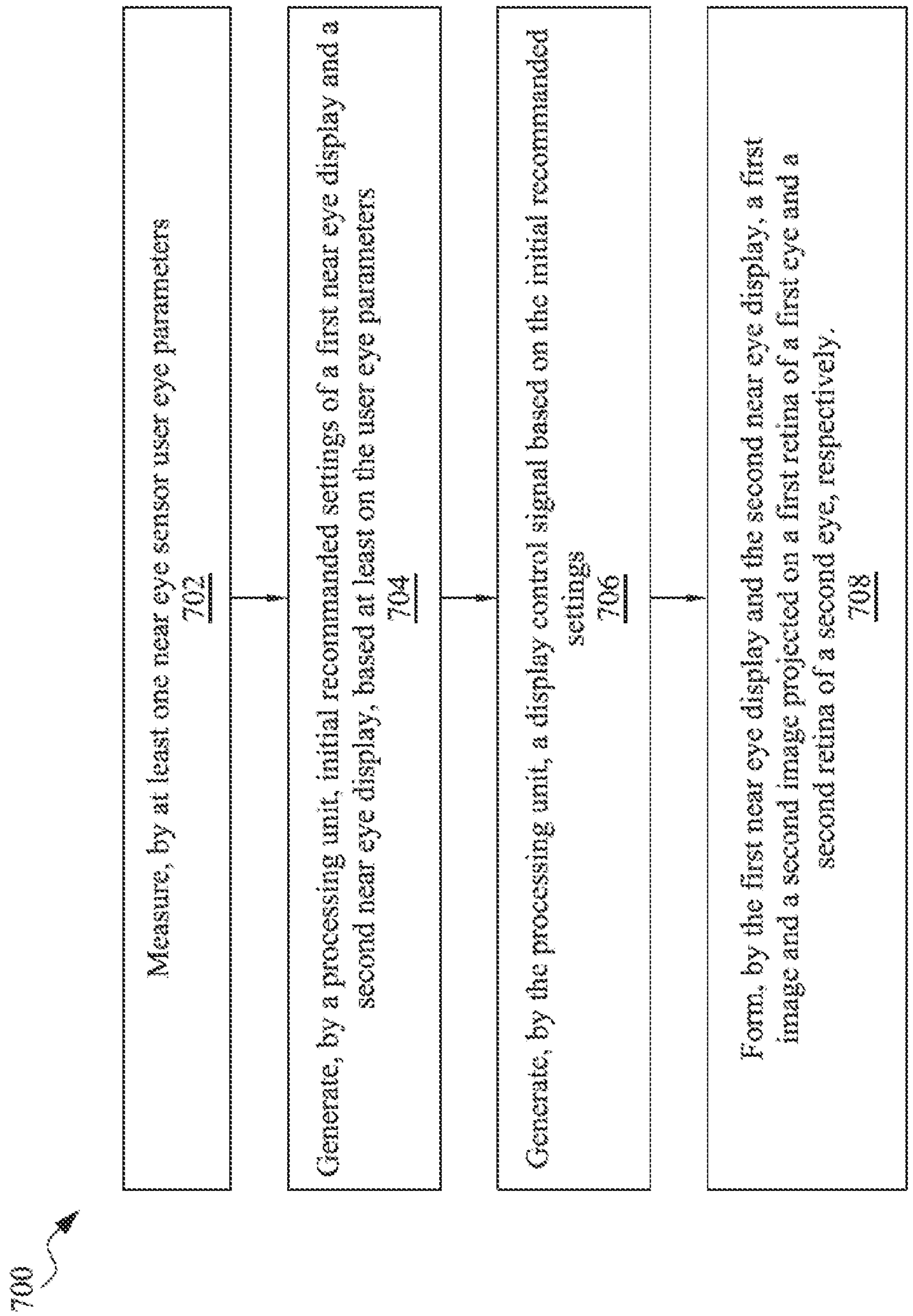
FIG. 7 is a flowchart illustrating an example method for operating a near eye display system in accordance with some embodiments.

FIG. 7 is a flowchart illustrating an example method 700 for operating a near eye display system in accordance with some embodiments. In the example shown in FIG. 7, the method 700 includes operations 702, 704, 706, and 708. Additional operations may be performed. Also, it should be understood that the sequence of the various operations discussed above with reference to FIG. 7 is provided for illustrative purposes, and as such, other embodiments may utilize different sequences. These various sequences of operations are to be included within the scope of embodiments.

At operation 702, user eye parameters (e.g., the user eye parameters 552 shown in FIG. 5) are measured by at least one near eye sensor (e.g., the near eye sensors 108*a* and 108*b* shown in FIG. 1).

At operation 704, initial recommended settings (e.g., the initial recommended settings 558 shown in FIG. 5) of a first near eye display (e.g., the near eye display 106*a* shown in FIG. 1) and a second near eye display (e.g., the near eye display 106*b* shown in FIG. 1) are generated by a processing unit (e.g., the MCU 502 shown in FIG. 5), based at least on the user eye parameters.

At operation 706, a display control signal (e.g., the display control signal 562 shown in FIG. 5) is generated by the processing unit, based on the initial recommended settings.

At operation 708, a first image (e.g., the image 408 shown in FIG. 4) and a second image (e.g., the image 408 shown in FIG. 4) are formed by the first near eye display and the second near eye display, respectively. The first image and the second image are projected on a first retina (e.g., the retina 306 shown in FIG. 3C) of a first eye (e.g., the eye 402 shown in FIG. 3C) and a second retina 306 of a second eye 402, respectively.

In accordance with some aspects of the disclosure, a near eye display system is provided. The near eye display system includes: a frame comprising a main body and two temple arms; at least one near eye sensor mounted on the main body and configured to measure user eye parameters; a first near eye display mounted on the main body and configured to form a first image projected on a first retina of a first eye; a second near eye display mounted on the main body and configured to form a second image projected on a second retina of a second eye; and a processing unit located at at least one of the two temple arms and configured to generate a display control signal based at least on the user eye parameters, wherein the display control signal drives the first near eye display and the second near eye display.

In accordance with some aspects of the disclosure, a method of operating a near eye display system is provided. The method includes the following steps: measuring, by at least one near eye sensor, user eye parameters; generating, by a processing unit, initial recommended settings of a first near eye display and a second near eye display, based at least on the user eye parameters; generating, by the processing unit, a display control signal based on the initial recommended settings; and forming, by the first near eye display and the second near eye display, a first image and a second image projected on a first retina of a first eye and a second retina of a second eye, respectively.

In accordance with some aspects of the disclosure, a near eye display system is provided. The near eye display system includes: at least one near eye sensor configured to measure user eye parameters; at least one near eye display configured to form a first image projected on a retina of an eye; and a processing unit configured to generate a display control signal, based at least on the user eye parameters to control the at least one near eye display, wherein the display control signal drives the at least one near eye display.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A near eye display system comprising:

a frame;

a first near eye display mounted on the frame and configured to form a first image directly projected on a first retina of a first eye of a user, wherein the first near eye display is opaque and fabricated on a silicon substrate that completely obscures the view of the user;

a second near eye display mounted on the frame and configured to form a second image directly projected on a second retina of a second eye of the user, wherein the first image comprises diffuse light and is directly projected from a first emissive layer of the first near eye display on the first retina of the first eye, and the second image comprises diffuse light and is directly projected from a second emissive layer of the second near eye display on the second retina of the second eye, and wherein the second near eye display is opaque and fabricated on a silicon substrate that completely obscures the view of the user, wherein both the first and second near eye displays comprise a silicon control transistor fabricated in a semiconductor process process; and a processing unit located at the frame and configured to generate a display control signal to drive the first near eye display and the second near eye display.

2. The near eye display system of claim 1, wherein the first near eye display includes a plurality of RGB pixels, each of the plurality of RGB pixels a luminous device electrically connected to the control transistor and controlled by a current generated by the control transistor, and wherein the first image is formed by controlling the luminous device of the plurality of RGB pixels.

3. The near eye display system of claim 1, wherein the first near eye display includes a plurality of RGB pixels, each RGB pixel comprising a luminous device, wherein the control transistor is electrically connected to the luminous device and configured to drive and control the luminous device by providing a current source.

4. The near eye display system of claim 3, wherein the luminous device is an organic light-emitting diode (OLED).

5. The near eye display system of claim 4, wherein the OLED is a small-molecule OLED (SM-OLED).

6. The near eye display system of claim 4, wherein the OLED is a polymer light-emitting diode (PLED).

7. The near eye display system of claim 3, wherein the control transistor is electrically connected to the luminous device through a multi-layer interconnect (MLI) structure.

8. A near eye display system comprising:

a frame;

at least one near eye display mounted on the frame and configured to form a first image directly projected on a retina of an eye of a user the first image comprises diffuse light and is directly projected from a first emissive layer of the first near eye display on the first retina of the first eye, and wherein the at least near eye display is opaque and fabricated on a silicon substrate that completely obscures the view of the user, wherein the at least one near eye display comprises a silicon control transistor fabricated in a front-end-of-the-line; and a processing unit located at the frame and configured to generate a display control signal to drive the at least one near eye display.

9. The near eye display system of claim 8, further comprising:

at least one near eye sensor mounted on the frame and configured to measure at least one user eye parameter.

10. The near eye display system of claim 9, wherein the processing unit generates the display control signal based at least on the at least one user eye parameter.

11. The near eye display system of claim 9, wherein the at least one near eye sensor is at least one CMOS image sensor.

12. The near eye display system of claim 9, wherein the at least one near eye sensor is at least one time of flight (TOF) sensor.

13. A method of operating a near eye display system comprising:

measuring, by at least one near eye sensor mounted on a frame of the near eye display system, at least one user eye parameter;

generating, by a processing unit located at the frame, a display control signal based on the at least one user eye parameter; and directly projecting, by a first near eye display and a second near eye display mounted on the frame, a first image and a second image on a first retina of a first eye and a second retina of a second eye, respectively, the first image comprises diffuse light and is directly projected from a first emissive layer of the first near eye display on the first retina of the first eye, and the second image comprises diffuse light and is directly projected from a second emissive layer of the second near eye display on the second retina of the second eye, and wherein the first and second near eye displays are opaque and fabricated on a silicon substrate that completely obscures the view of the user, and wherein both the first and second near eye displays comprise a silicon control transistor fabricated in a semiconductor process.

14. The method of claim 13, wherein the directly projecting is based on the display control signal.

* * * * *